(12) United States Patent
Vinod

(10) Patent No.: US 11,455,668 B2
(45) Date of Patent: Sep. 27, 2022

(54) METHOD AND SYSTEM OF AUTOMATIC BILLING OF TRANSPORTATION SERVICES

(71) Applicant: Babu Vinod, Fremont, CA (US)

(72) Inventor: Babu Vinod, Fremont, CA (US)

( * ) Notice: Subject to any disclaimer, the term of this patent is extended or adjusted under 35 U.S.C. 154(b) by 0 days.

(21) Appl. No.: 16/833,644

(22) Filed: Mar. 29, 2020

(65) Prior Publication Data

US 2021/0406968 A1 Dec. 30, 2021

Related U.S. Application Data

(63) Continuation-in-part of application No. 15/432,931, filed on Feb. 15, 2017, now abandoned.

(60) Provisional application No. 62/295,145, filed on Feb. 15, 2016.

(51) Int. Cl.
*G06Q 30/04* (2012.01)
*G06Q 20/10* (2012.01)
*H04W 4/02* (2018.01)
*H04W 4/029* (2018.01)

(52) U.S. Cl.
CPC .......... *G06Q 30/04* (2013.01); *G06Q 20/102* (2013.01); *H04W 4/023* (2013.01); *H04W 4/025* (2013.01); *H04W 4/029* (2018.02)

(58) Field of Classification Search
CPC .... H04W 4/029; H04M 3/5158; G06Q 20/12; G06Q 50/30
USPC ......................................................... 455/411
See application file for complete search history.

(56) References Cited

U.S. PATENT DOCUMENTS

| 9,998,596 | B1* | 6/2018 | Dunmire | H04M 3/5158 |
| 2009/0209233 | A1* | 8/2009 | Morrison | H04W 4/029 455/411 |
| 2016/0132857 | A1* | 5/2016 | Unser | G06Q 20/12 705/39 |
| 2019/0051174 | A1* | 2/2019 | Haque | G06Q 50/30 |

* cited by examiner

*Primary Examiner* — William D Cumming

(57) ABSTRACT

In one aspect, a process for automatic billing of transportation services includes the step of generating a first travel vector for a traveler. The process includes the step of generating a second travel vector for a travel provider. The process includes the step of determining that the traveler's location and movement is synchronized with a travel-service provider within a specified distance threshold. The process includes the step of comparing first travel vector with second travel vector. The process includes the step of determining that the first vector and the second vector are within the specified distance threshold. The process includes the step of measuring the time period that the first vector and the second vector are within the specified distance threshold. The process includes the step of billing the traveler for the time period that the first vector and the second vector are within the specified distance threshold.

4 Claims, 8 Drawing Sheets

METHOD AND SYSTEM OF AUTOMATIC BILLING OF TRANSPORTATION SERVICES

CROSS-REFERENCE TO RELATED APPLICATIONS

This application claims priority to U.S. application Ser. No. 15/432,931, titled and METHOD AND SYSTEM OF AUTOMATIC BILLING OF TRANSPORTATION SERVICES filed on Feb. 15, 2017. U.S. application Ser. No. 15/432,931 claims priority to U.S. Provisional Application No. 62/295,145, titled and METHOD AND SYSTEM OF AUTOMATIC BILLING OF TRANSPORTATION SERVICES filed on Feb. 15, 2016. This provisional application is incorporated by reference in its entirety.

BACKGROUND

1. Field

This application relates generally to automated travel services, and more specifically to a system, article of manufacture and method for automatic billing of transportation services.

2. Related Art

Travel service providers can charge travelers for using their services to travel. Example travel providers can be ride sharing services, taxis, ferries, buses, airplanes, etc. A user can be required to pay the travel-service provider upon entry into the travel service provider's vehicle. A user can be required to pay the travel-service provider upon exit from the travel service provider's vehicle. In either case, disputes as the cost can arise between the traveler and the travel service provider. Accordingly, improvements to the methods of calculating a traveler's bill for using a travel-service provider are sought.

BRIEF SUMMARY OF THE INVENTION

In one aspect, a process for automatic billing of transportation services includes the step of generating a first travel vector for a traveler. The process includes the step of generating a second travel vector for a travel provider. The process includes the step of determining that the traveler's location and movement is synchronized with a travel-service provider within a specified distance threshold. The process includes the step of comparing first travel vector with second travel vector. The process includes the step of determining that the first vector and the second vector are within the specified distance threshold. The process includes the step of measuring the time period that the first vector and the second vector are within the specified distance threshold. The process includes the step of billing the traveler for the time period that the first vector and the second vector are within the specified distance threshold.

Figure 1:
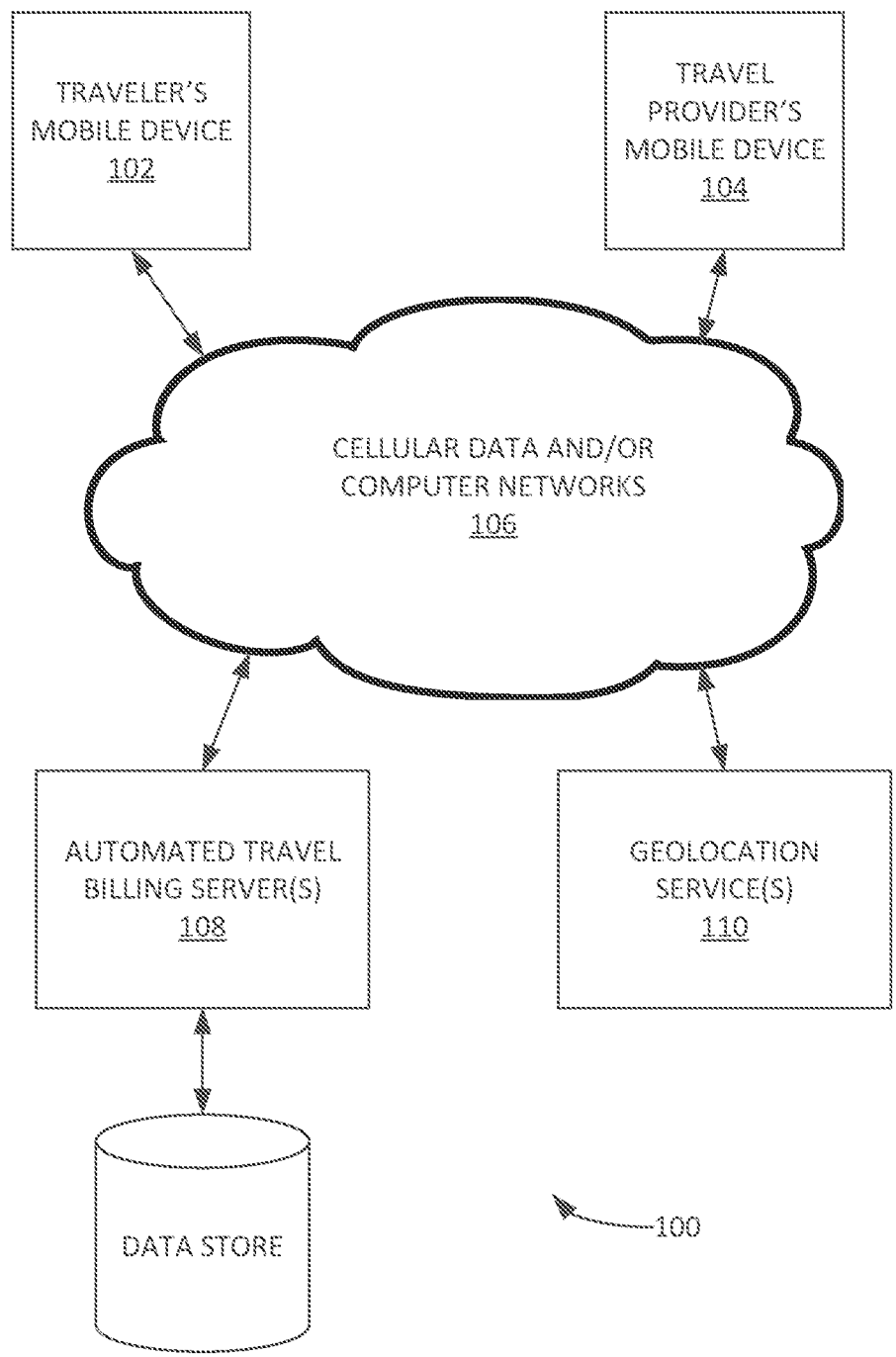
FIG. 1 illustrates an example system for automatic billing of transportation services, according to some embodiments.

The Figures described above are a representative set, and are not an exhaustive with respect to embodying the invention.

DESCRIPTION

Disclosed are a system, method, and article of manufacture for automatic billing of transportation services. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' 'an embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

E-commerce payment system facilitates the acceptance of electronic payment for online transactions.

Global Positioning System (GPS) is a space-based navigation system that provides location and time information. Each GPS satellite continually broadcasts a signal (carrier wave with modulation) that includes: A pseudorandom code (sequence of ones and zeros) that is known to the receiver. By time-aligning a receiver-generated version and the receiver-measured version of the code, the time of arrival (TOA) of a defined point in the code sequence, called an epoch, can be found in the receiver clock time scale. A message that includes the time of transmission (TOT) of the code epoch (in GPS time scale) and the satellite position at that time. Conceptually, the receiver measures the TOAs (according to its own clock) of four satellite signals. From the TOAs and the TOTs, the receiver forms four time of flight (TOF) values, which are (given the speed of light) approximately equivalent to receiver-satellite ranges. The receiver then computes its three-dimensional position and clock deviation from the four TOFs. In practice the receiver position (in three dimensional Cartesian coordinates with origin at the Earth's center) and the offset of the receiver clock relative to the GPS time are computed simultaneously, using the navigation equations to process the TOFs. The receiver's Earth-centered solution location is usually converted to latitude, longitude and height relative to an ellipsoidal Earth model. The height may then be further converted to height relative to the geoid, which is essentially mean sea level. These coordinates may be displayed, such as on a moving map display, or recorded or used by some other system, such as a vehicle guidance system.

Geolocation is the identification of the real-world geographic location of an object, such as a mobile device. Geolocation may refer to the practice of assessing the location and/or to an actual assessed location.

Location-based services (LBS) are a general class of computer program-level services that use location data to control features. As such LBS is an information service and has a number of uses in social networking today as an entertainment service, which is accessible with mobile devices through the mobile network and which uses information on the geographical position of the mobile device.

Transportation network company (TNC) can connect paying passengers with drivers who provide the transportation on their own non-commercial vehicles. All parties connect to the service via website and mobile applications.

Travel vector can be a representation of a user's travel based on, inter alia: a time variable, a speed variable, an acceleration variable, a set of location variables (e.g. as a series as a function of time, etc.), etc., according to some embodiments. Travel vector can include a Euclidean vector that is a geometric object that has magnitude (e.g. that represents speed, velocity, acceleration, etc.) and direction.

Wi-Fi positioning system (WPS) can use various indoor positioning systems techniques to determine a mobile device's location. For example, WPS can determine a position of a mobile device with wireless access points based on measuring the intensity of the received signal (e.g. received signal strength indication) and/or the method of fingerprinting. Example parameters useful to geo-locate with WPS include, for example: Wi-Fi hotspot identity and location; wireless access point identity and location (e.g. including the SSID and the MAC address of the access point); etc.

Example Systems

FIG. 1 illustrates an example system 100 for automatic billing of transportation services, according to some embodiments. System 100 can enable automatic billing of transportation services. For example, a user (e.g. a traveler) can have a mobile device. The mobile device can be used to track the user's location and travel (e.g. a user's movement through various geolocations). The mobile devices can be GPS-enabled devices. In some examples, a user can be a package or object with a mobile device connected to it. For example, a computerized peripheral devices can include systems for obtaining GPS and/or cellular location information (e.g. can be enabled via USB, Bluetooth or expansion slots allow the computer to utilize the GPS system, etc.).

Another user (e.g. a travel provider) can also have a mobile device. The mobile device can be used to track the travel provider's location and travel. Example travel providers can be people that operate vehicles for travel (e.g. a bus driver, a ride-share driver, a taxi driver, an airplane pilot, a boat operator, a train conductor, etc.).

System 100 can detect when a traveler uses a travel provider's vehicle. For example, system 100 can detect that the traveler and the travel provider are in substantially the same location (e.g. within a specified distance threshold for a specified percentage of time, etc.) and/or traveling in the same speed, directions, etc. This can cause system 100 to determine that the traveler is using the travel provider's vehicle. System 100 can automatically bill the traveler for the period that the traveler is traveling with the travel provider.

In one example, a bus driver can have a mobile device with an application that tracks the geolocation of the bus driver. The user can ride the bus. The user can have a mobile device that tracks the user's geolocation. System 100 can determine that the user rode the bus for a certain distance and/or time and bill the user's payment account accordingly. System 100 can use online payments system for said pecuniary transactions.

More specifically, system 100 can include traveler's mobile device 102. Traveler's mobile device 102 can include a geolocation application that geolocates the traveler's geolocation (e.g. on a periodic basis) and communicates said geolocation to automated travel billing server(s) 108 via network(s) 106. Traveler's mobile device 102 can also include information used to verify the travel provider's identity and/or other metadata. The application can also enable a user to interface with system 100 (e.g. via a website, an application user interface, etc.). In this way, a user can verify travel, input billing options, credit card information, etc.

Travel provider's mobile device 104 can include a geolocation application that geolocates the traveler's geolocation (e.g. on a periodic basis) and communicates said geolocation to automated travel billing server(s) 108 via network(s) 106. Travel provider's mobile device 104 can also include information used to verify the travel provider's identity and/or other metadata. The travel provider's application can also include other services for various operations, such as, verifying travel, inputting billing options, credit card information, etc.

Automated travel billing server(s) 108 can track the geolocation of various users (e.g. by receiving geolocation information from user mobile devices, etc.). Automated travel billing server(s) 108 can represent a user's location as a function of time, speed, etc. as a travel profile. Automated travel billing server(s) 108 can generate a travel profile for its users. Travel profiles can be mathematically represented as vectors based on such variables/parameters as geolocation (e.g. in a time series), time, speed, geolocation accuracy information, travel routes, etc. Various mathematical operations can be implemented to determine matches (e.g. based on specified threshold similarities between two or more travel vector values). Automated travel billing server(s) 108 can automatically bill users for travel services. Automated travel billing server(s) 108 can include other functionalities, such as, inter alia: databases (e.g. a data store), database managers, web servers, calculators, statistics engines, APIs for interaction with third-party systems, user-profile managers, security systems, mapping systems, etc. In some embodiments, third-party systems (e.g. geolocation service(s) 110) can track and/or assist in tracking a user's geolocation. Geolocation service(s) 110 can include various entities (e.g. cell phone service providers, mobile-device application providers, mapping server providers, Wi-Fi service providers, governmental entities, etc.) that also track a user's mobile device location.

In some embodiments, a fee can be determined based on a distance a user traveled. In other cases, the fee can be determined based on time the user was in a travel vehicle (e.g. automobile, bus, boat, airplane, train, other mass transit systems, etc.). In some examples, ride-sharing factors can be calculated into the user's final bill. For example, users be in a 'ride share' mode. System 100 can detect that two or more users are in a vehicle and automatically split the bill based on the number of 'ride share' mode users in the vehicle. System 100 can implement the following processes and methods provide infra. System 100 and the processes provided infra can be integrated with mobile ride request company's services (e.g. as a billing method of an Uber® ride, etc.).

Example Methods

Figure 2:
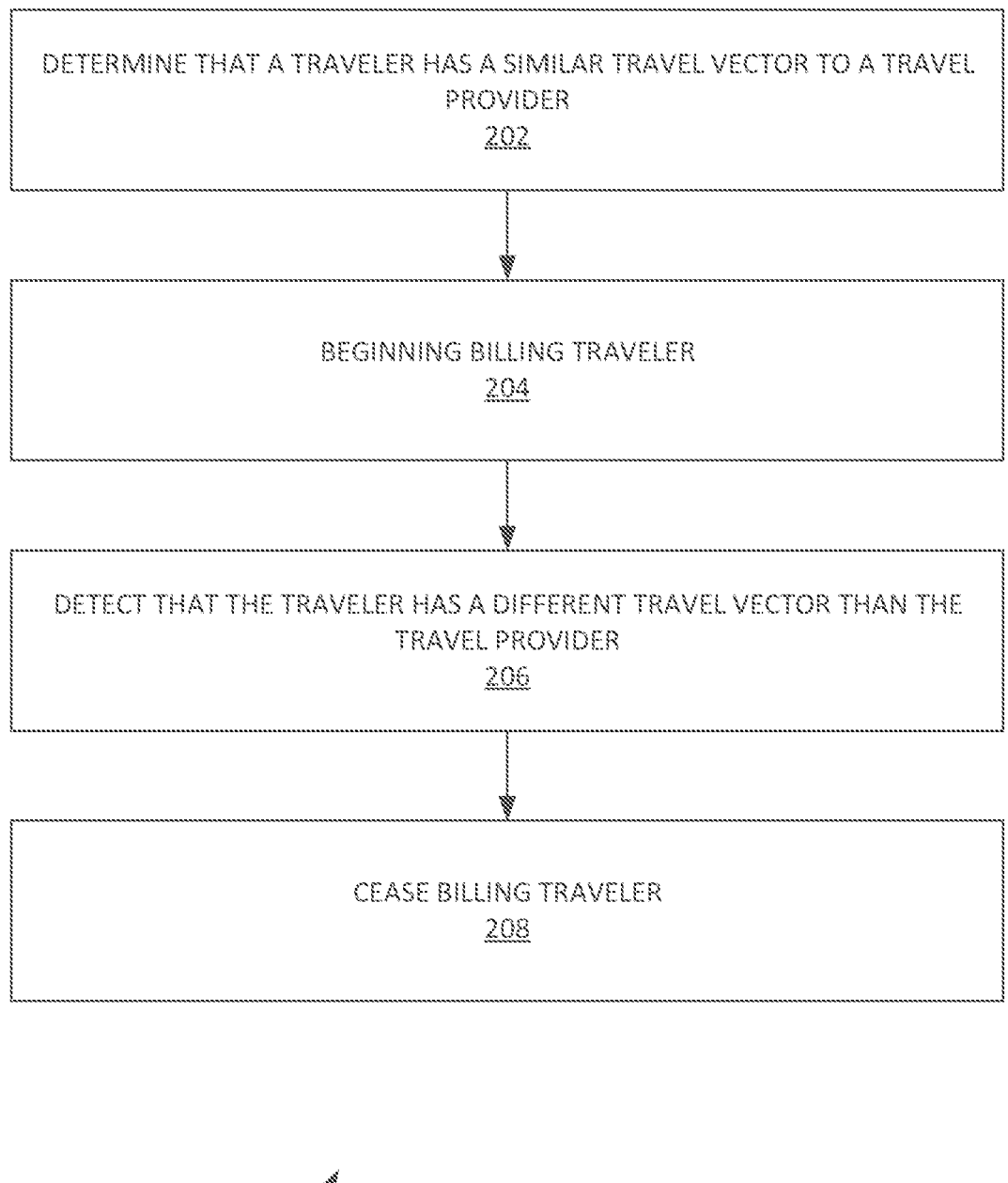
FIG. 2 illustrates an example process for automatic billing of transportation services, according to some embodiments.

FIG. 2 illustrates an example process 200 for automatic billing of transportation services, according to some embodiments. In step 202, process 200 can determine that a traveler has a similar travel vector to a travel provider. For example, process 200 can determine that the traveler's location and movement is synchronized with a travel-service provider and/or a travel-service provider's vehicle. Locations can be determined by tracking a GPS signal at specified periods and extrapolating a position and movement from said GPS signal. The GPS signal can be associated with mobile device of the travel, travel provider, etc. GPS signals and/or data about the GPS signals can be obtained by a server that implements process 200. In step 204, process 200 can begin billing traveler (e.g. calculating an amount due from the traveler at specified intervals and/or distances and/or preset locations). It is noted that a final bill can be submitted to an online billing service or other electronic payment entity after the traveler has stopped using the travel-provider's service. In step 206, process 200 can detect that the traveler has a different travel vector than the travel provider. In step 208, process 200 can cease billing traveler. Process 200 can provide a metering process for user's obtaining rides on various means of transportation. Process 200 does not require additional hardware computing systems beyond the mobile devices of the users and the server computing system that implements process 200.

Figure 3:
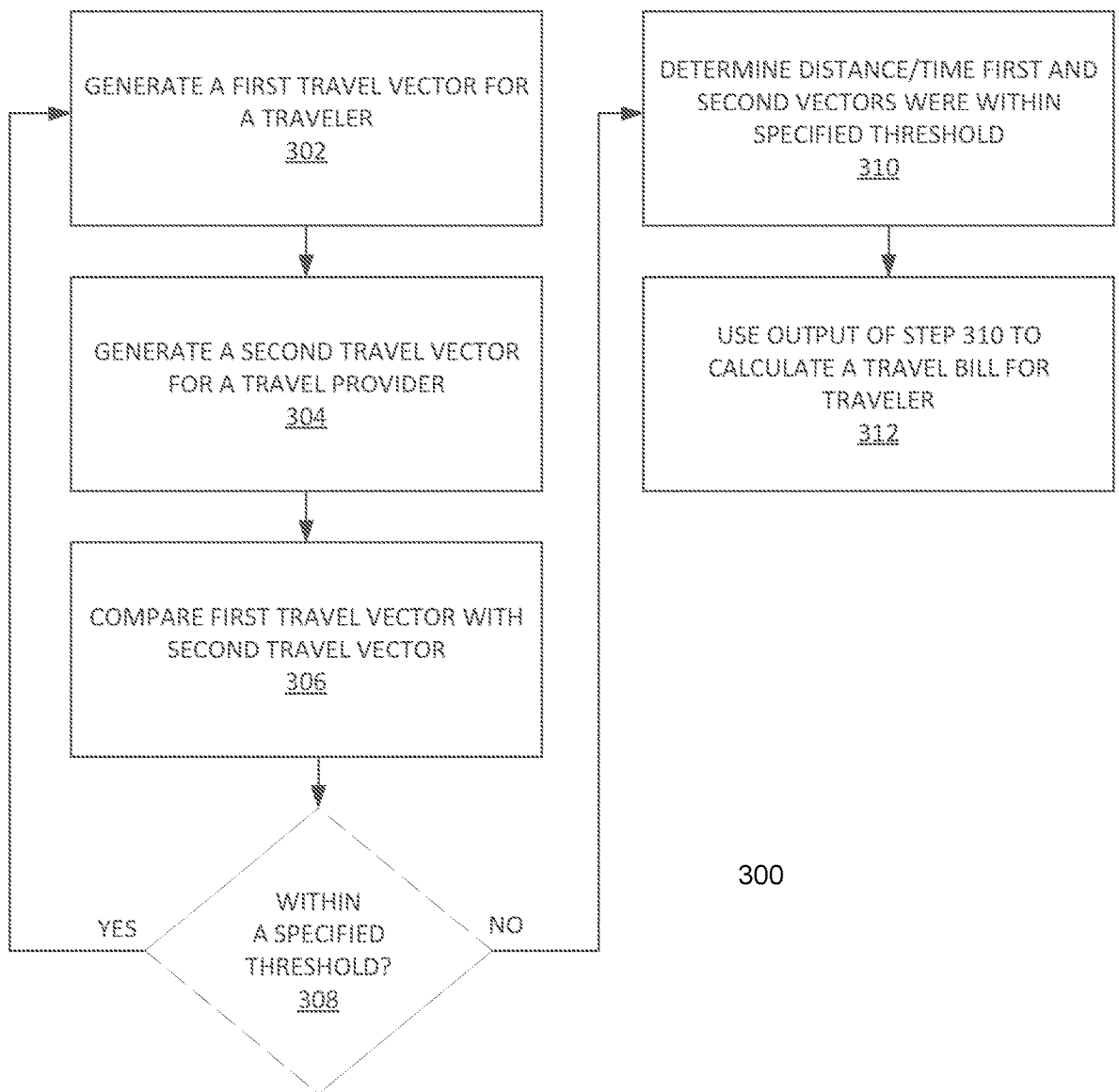
FIG. 3 illustrates another example process for automatic billing of transportation services, according to some embodiments.

FIG. 3 illustrates another example process 300 for automatic billing of transportation services, according to some embodiments. In step 302, process 300 can generate a first travel vector for a traveler.

A travel vector can be a mathematical representation of various travel attributes such as, inter alia: speed of travel, direction of travel, change of speed in a location, etc. For example, the various systems of FIG. 100 (e.g. mobile device GPS systems, etc.) can be periodically obtained and stored in a data store. This can be performed for each mobile device of a user and/or a mobile device of a travel provider vehicle. The generation of the travel vector can be triggered by an event that indicates the user (e.g. as represented by the first travel vector) is riding in the travel vehicle (e.g. as represented by the second travel vector). For example, this can be done periodically while the user mobile device is within a specified distance of the travel provider vehicle for a specified period of time and it is determined that the user mobile device and the travel provider vehicle are travelling at a same speed along a same route. The specified distance can be the equivalent of the length of the passenger carriage of the travel vehicle and/or in a location that indicates the user is within the passenger carriage. In another example, an application in the user mobile device and/or the mobile device of a travel provider vehicle can be used to check in and check out the travel provider into the travel service. Once the trigger to begin is detected, a common route of the user and the travel vehicle can be generated. The length and/or time of the common route can be used to determine a billing charge to the user (e.g. to a user's travel application account, etc.). The travel provider's travel vector (e.g. the second travel vector) can be continuously updated while the travel provider vehicle is in use during a specified use period (e.g. a day, a week, a work shift, a route, a ride-share activity, etc.).

As noted, the travel vectors can include periodically obtained values for the speed of travel, direction of travel, change of speed in a location, user location with a passenger carriage, etc. The travel vector can be a vector data structure and/or an array data structure. Accordingly, the travel vector can include a collection of elements (e.g. values or variables), each identified by at least one array index or key. The travel vector can be stored such that the position of each element can be computed from its index tuple by a specified mathematical formula. In one example, the data structure of the travel vectors can be a linear array. The GPS data can be converted to latitude, longitude (e.g. latlng) and height relative to an ellipsoidal Earth model. The height may then be further converted to height relative to the geoid, which is essentially mean sea level. These coordinates can be recording to the various travel vectors. These coordinates can also be displayed, such as on a moving map display, or recorded or used by some other system, such as a vehicle guidance system. The coordinates can be stored into the travel vectors in Degree, Minute and Seconds (DMS) and/or the Decimal Degree (DD) formats. It is noted that cell phone service provider location information can also be converted to geo-coordinates and stored into the travel vectors in DMS and/or the Decimal Degree DD formats. It is noted that in some examples, both GPS and cell phone service provider location information can be used to generate an aggregated and/or averaged set of geo-coordinates that are then stored in the travel vectors.

For example, an array of 10 32-bit (4 bytes) integer variables, with indices 0 through 9, may be stored as 10 words at memory addresses 2000, 2004, 2008, ..., 2036, so that the element with index i has the address 2000+(i×4). The memory address of the first element of an array is called first address, foundation address, or base address. This is provided by way of example and not of limitation.

It is noted that the travel vectors can include the time of transmission (TOT) of the code epoch (e.g. in GPS time scale) and the satellite position at that time. This can be used to synchronize the time stamped of the data and metadata in the various travel vectors.

In one example, travel vectors can be a time series of data points (e.g. taken at specified intervals such as every one second, every ten seconds, etc.) for periodically obtained values for the speed of travel, direction of travel, change of speed in a location, user location with a passenger carriage, etc. As represented in the travel vector the time series is a series of data points indexed (or listed or graphed) in time order. Most commonly, a time series is a sequence taken at successive equally spaced points in time. In this way, the speed of travel, direction of travel, change of speed in a location, user location with a passenger carriage, etc. can be stored and/or represented as a sequence of discrete-time data.

In step 304, process 300 can generate a second travel vector for a travel provider. In step 306, process 300 can compare first travel vector with second travel vector. Various methods of determine a distance between two vectors and/or similarity measures between two vectors can be used. In step 308, process 300 can determine if the difference between the first travel vector and the second travel vector are within a specified threshold. For example, a bus driver's travel vector and a rider's travel vector need not exactly matches. A buffer can be given such that slight differences can be taken into account. In this way, a small variation based on geolocation service error and the like can be taken into account and not proceed to step 312 prematurely. In step 310, process 300 can determine distance/time first and second vectors were within specified threshold. If no, then in step 312, process 300 can use output of step 310 to calculate a travel bill for traveler. If yes, then process 300 can return to step 302. In repeating process 300, process 300 need not generate the travel vectors anew. Rather, process 300 can update the travel vectors on a periodic basis.

Additional Exemplary Computer Architecture and Systems

Figure 4:
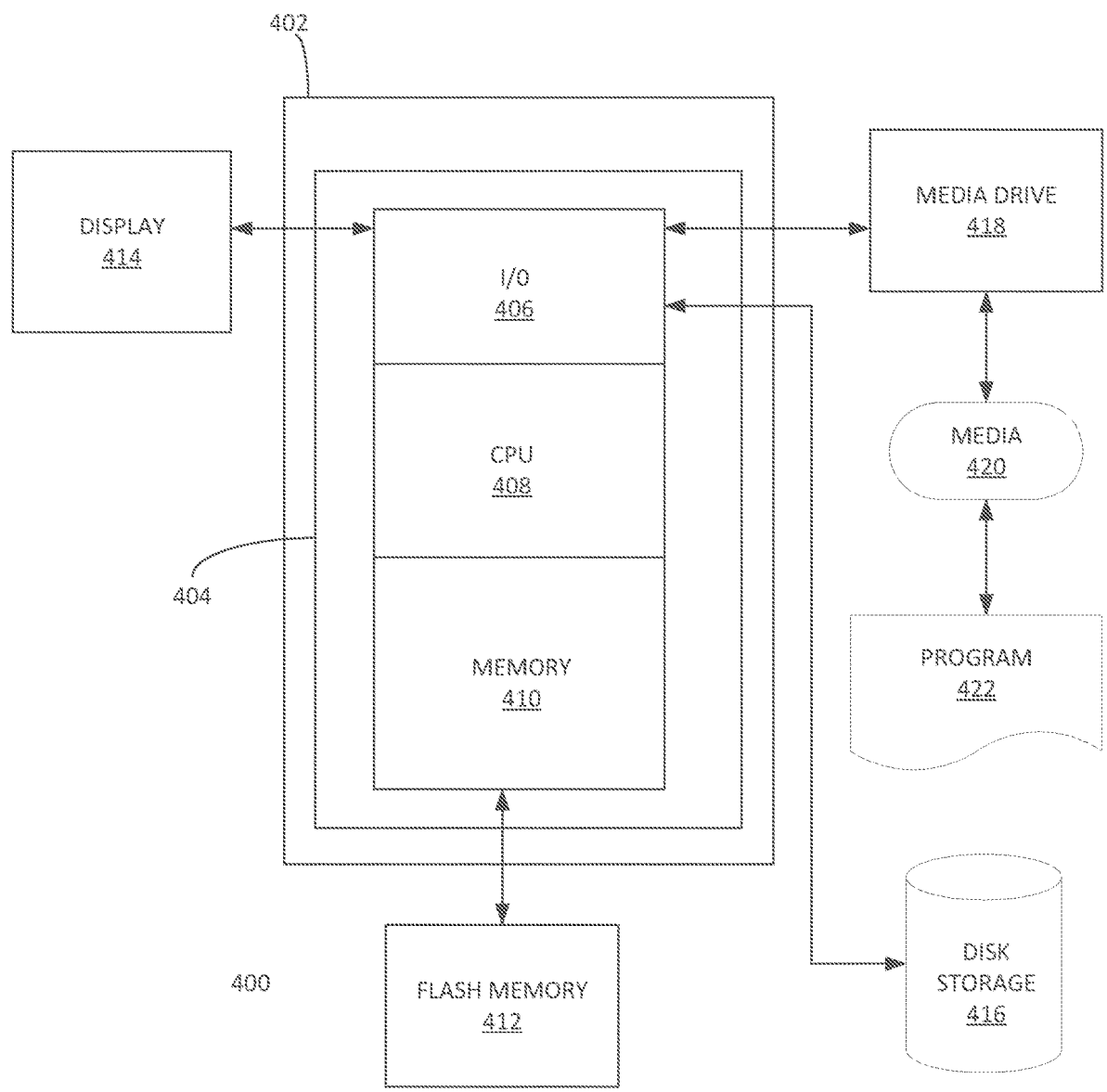
FIG. 4 depicts an exemplary computing system that can be configured to perform any one of the processes provided herein.

FIG. 4 depicts an exemplary computing system 400 that can be configured to perform any one of the processes provided herein. In this context, computing system 400 may include, for example, a processor, memory, storage, and I/O devices (e.g., monitor, keyboard, disk drive, Internet connection, etc.). However, computing system 400 may include circuitry or other specialized hardware for carrying out some or all aspects of the processes. In some operational settings, computing system 400 may be configured as a system that includes one or more units, each of which is configured to carry out some aspects of the processes either in software, hardware, or some combination thereof.

FIG. 4 depicts computing system 400 with a number of components that may be used to perform any of the processes described herein. The main system 402 includes a motherboard 404 having an I/O section 406, one or more central processing units (CPU) 408, and a memory section 410, which may have a flash memory card 412 related to it. The I/O section 406 can be connected to a display 414, a keyboard and/or other user input (not shown), a disk storage unit 416, and a media drive unit 418. The media drive unit 418 can read/write a computer-readable medium 420, which can contain programs 422 and/or data. Computing system 400 can include a web browser. Moreover, it is noted that computing system 400 can be configured to include additional systems in order to fulfill various functionalities. Computing system 400 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 5:
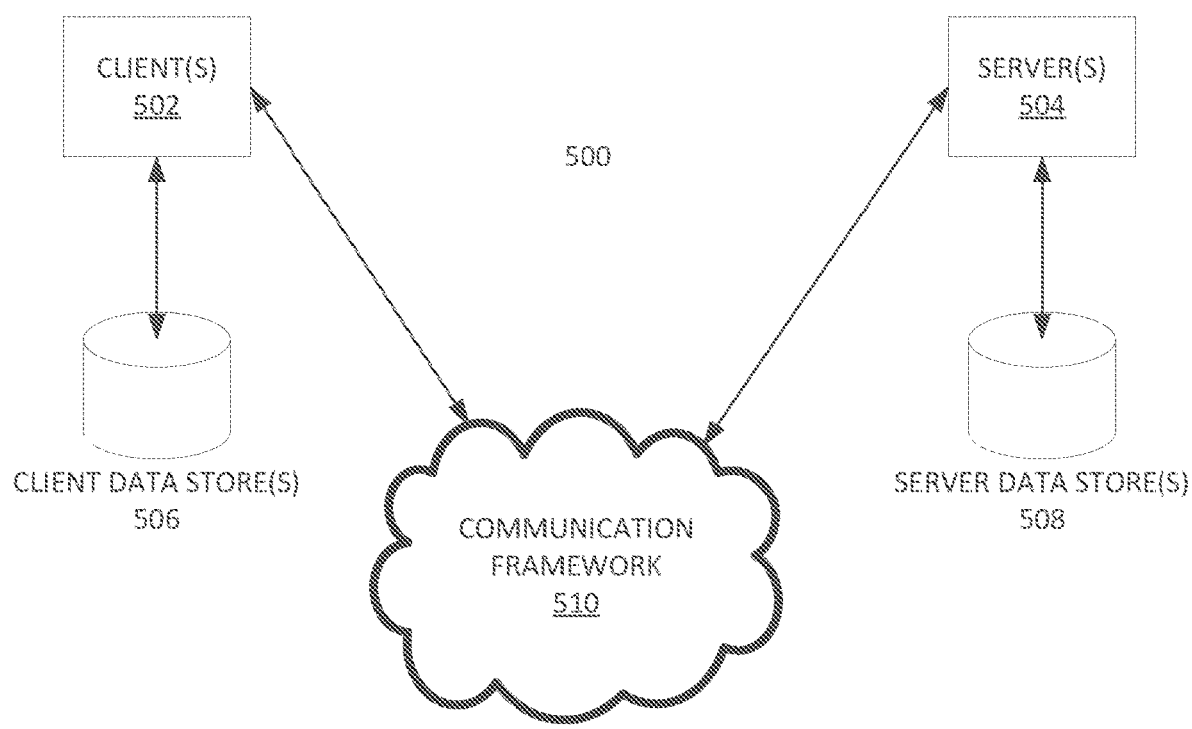
FIG. 5 is a block diagram of a sample computing environment that can be utilized to implement various embodiments.

FIG. 5 is a block diagram of a sample-computing environment 500 that can be utilized to implement various embodiments. The system 500 further illustrates a system that includes one or more client(s) 502. The client(s) 502 can be hardware and/or software (e.g., threads, processes, computing devices). The system 500 also includes one or more server(s) 504. The server(s) 504 can also be hardware and/or software (e.g., threads, processes, computing devices). One possible communication between a client 502 and a server 504 may be in the form of a data-packet adapted to be transmitted between two or more computer processes. The system 500 includes a communication framework 510 that can be employed to facilitate communications between the client(s) 502 and the server(s) 504. The client(s) 502 are connected to one or more client data store(s) 506 that can be employed to store information local to the client(s) 502. Similarly, the server(s) 504 are connected to one or more server data store(s) 508 that can be employed to store information local to the server(s) 504. In some embodiments, system 500 can instead be a collection of remote computing services constituting a cloud-computing platform.

Additional Exemplary Methods

In one example, system 100 and processes 200-300 can utilized a pricing method similar to that of metered taxis. However, the payment can be handled through a mobile-device application and not with the driver personally. In some examples, when a travel provider's vehicle is travelling at a speed greater than a specified speed (e.g. 11 mph (18 km/h), etc.), the price is calculated on a distance basis; otherwise, the price can be calculated on a time basis. At the end of a ride, the complete fare is automatically billed to the customer's credit card. An automated algorithm can increase prices based on factors as, inter alia: time of day, availability of travel provider(s), local events, etc. system 100 and processes 200-300 can send the traveler's mobile-device application a notice when making a travel-related. It is noted that various payments and money transfers to be made through the Internet. Online money transfers can serve as electronic alternatives to paying with traditional paper methods, such as checks and money orders.

Figure 6:
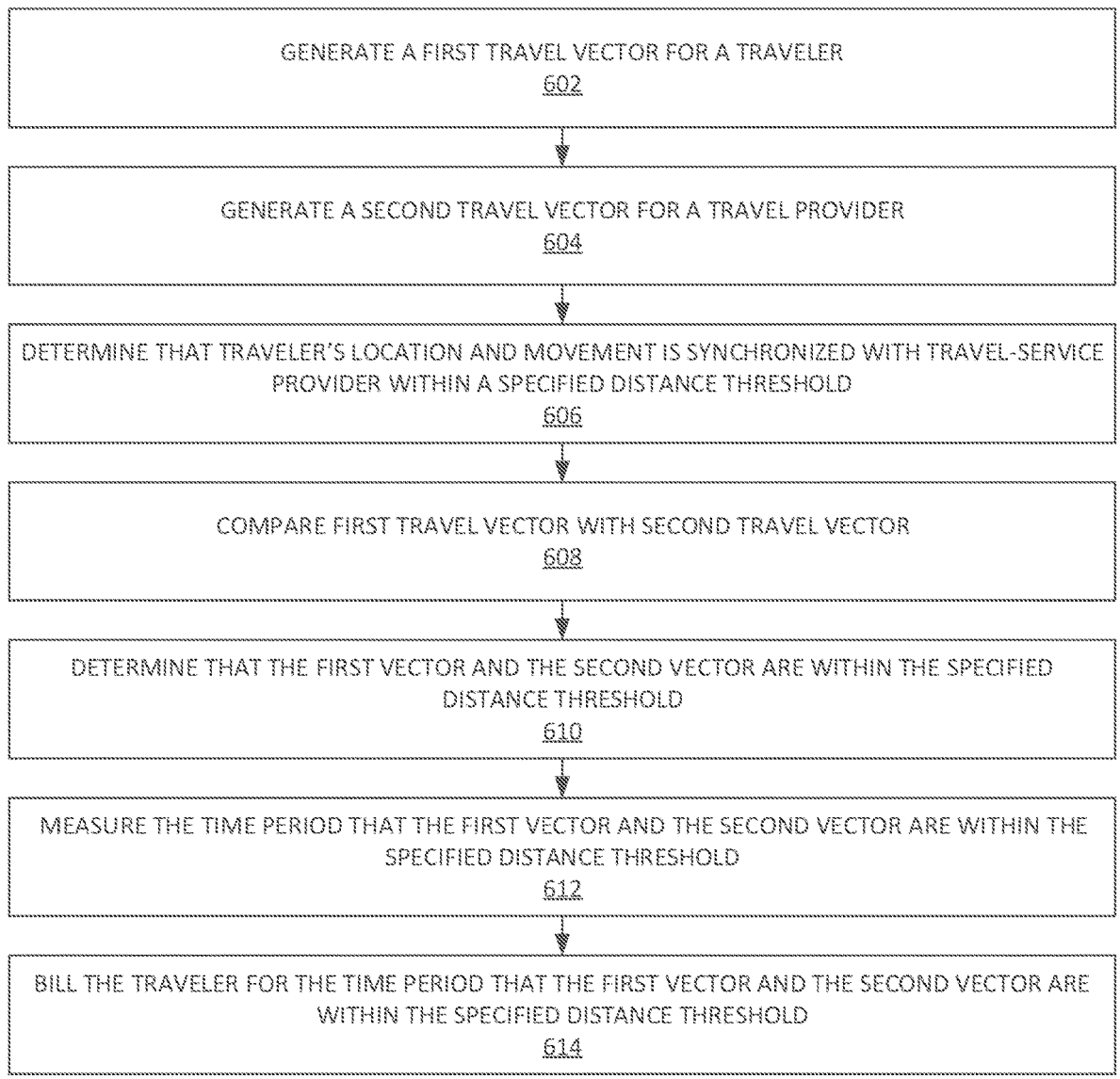
FIG. 6 illustrates an example process for automatic billing of transportation services, according to some embodiments.

FIG. 6 illustrates an example process 600 for automatic billing of transportation services, according to some embodiments. In step 602, process 600 can generate a first travel vector for a traveler. In step 604, process 600 can generate a second travel vector for a travel provider. In step 606, process 600 can determine that the traveler's location and movement is synchronized with a travel-service provider within a specified distance threshold. In step 608, process 600 can compare first travel vector with second travel vector. In step 610, process 600 can determine that the first vector and the second vector are within the specified distance threshold. In step 612, process 600 can measure the time period that the first vector and the second vector are within the specified distance threshold. In step 614, process 600 can bill the traveler for the time period that the first vector and the second vector are within the specified distance threshold.

Figure 7:
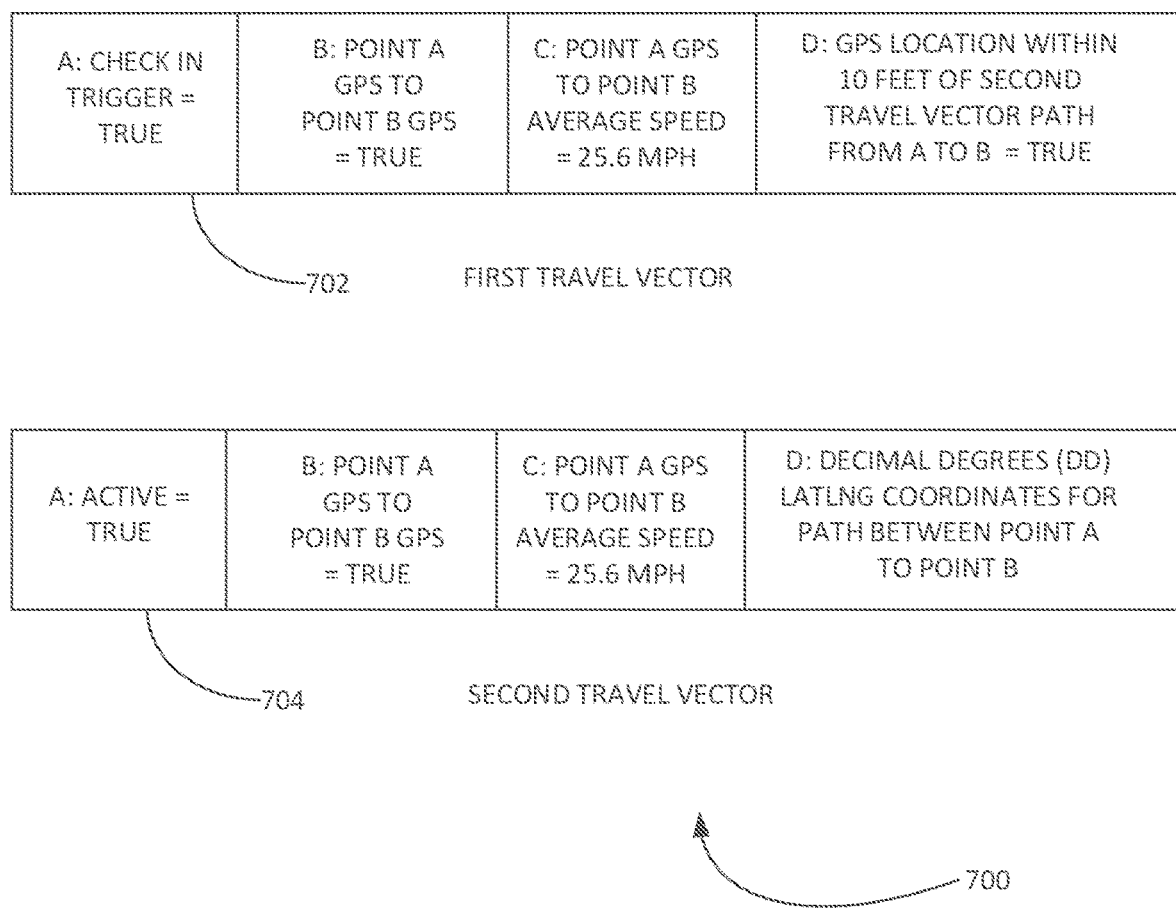
FIG. 7 illustrates an example schematic representation of a first travel vector and a second travel vector, according to some embodiments.

FIG. 7 illustrates an example schematic representation of a first travel vector 702 and a second travel vector 704, according to some embodiments. As shown the first travel vector includes various variables, herein A-D. The variables can include information for various time-series data such as, inter alia: periodically obtained values for the speed of travel, direction of travel, change of speed in a location, user location with a passenger carriage, etc. In the present example, the variables include: a: check in trigger=true (e.g. shows that the traveler has checked in to ride in the travel vehicle); b: point A GPS to point A GPS=true (e.g. includes GPS data showing a route from a point A to point B); c: point A GPS to point B average speed=25.6 mph (e.g. shows the median rate of speed the traveler has traveled from point A to point B) d: GPS location within 10 feet of second travel vector path from A to B=true (e.g. shows that the traveler has maintained a distance within 10 feet from the path of the second travel vector 704), as shown.

The second travel vector 704 includes comparable variables A-C. These variable can include identical data types with variables A-C of first travel vector 702. These variable can include data types that are comparable and/or synonymous with variables A-C of first travel vector 702 and/or data types that are comparable and/or synonymous. Second travel vector 704 can include, inter alia: A: active=true; B: point A GPS coordinates to point B GPS coordinates=true; C: point A GPS to point B average speed=25.6 mph; D: decimal degrees (DD) latlng coordinates for path between point A to point B. When the fields of A-C of first travel vector 702 are equal to the corresponding fields A-C second travel vector 704, the traveler can be charged to the period of time that the fields are equal. It is noted that in some embodiments, not all of the fields need be exactly equal but can fall within a specified range of tolerance. In some example, if at least three fields (and/or other specified percentage of fields) are equal, then the traveler can be charged to the period of time that at least three of the fields are equal.

In some examples, machine learning algorithms can be used to improve estimates of the values of the fields A-C. Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

It is noted that other types of data that can be collected can include, inter alia: a number of people in a transportation vehicle, a table of recent route locations (e.g. scheduled travel stops) and time on route and anticipated time used to calculate the charges. When data for a specified field is not available for a portion or all of a route traveled, various proxies can be utilized. These can include determining a minimum route available for a traveler and charging for the minimum travelable route. This can also include, using historically traveled routes as proxy for a currently travelled route (e.g. in the case of a repetitive commuter, etc.).

Figure 8:
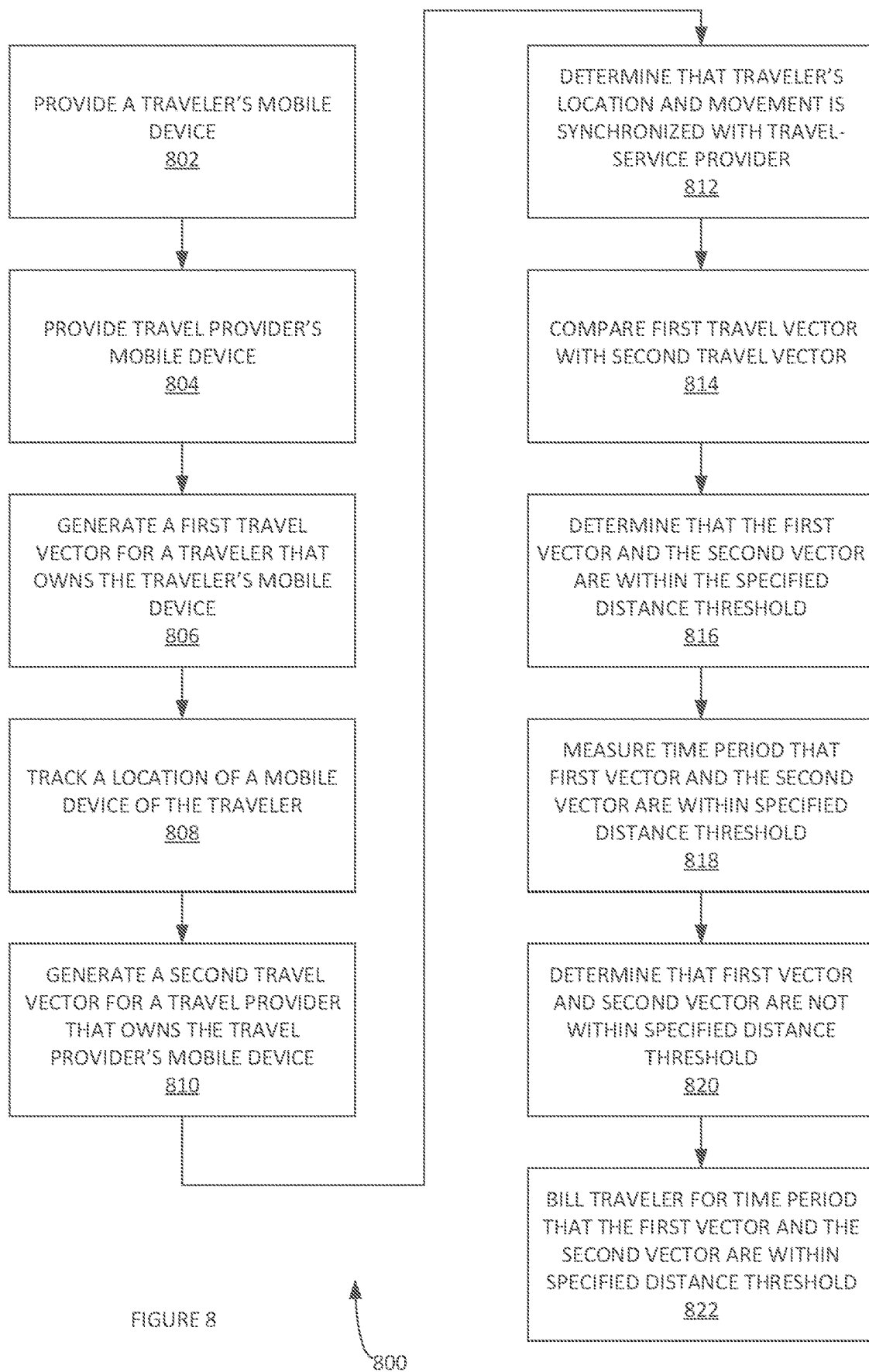
FIG. 8 illustrates an example process for automatic billing of transportation services, according to some embodiments.

FIG. 8 illustrates an example process 800 for automatic billing of transportation services, according to some embodiments. In step 802, a traveler's mobile device is provided. The traveler's mobile device includes a traveler's mobile device global positioning system (GPS). The traveler's mobile device obtains a traveler's mobile device location from the traveler's mobile device GPS and a cell phone service provider location information for the traveler's mobile device and communicates a first electronic signal through a cellular data network to an automated travel billing server. The first electronic signal includes the traveler's mobile device location and the cell phone service provider location information for the traveler's mobile device at a specified period to the automated travel billing server.

In step 804, process 800 provides a travel provider's mobile device, wherein the traveler provider's mobile device comprises a travel provider's global positioning system (GPS). The travel provider's mobile device obtains a travel provider's mobile device location from the travel provider's mobile device GPS and another cell phone service provider location information for the travel provider's mobile device and communicates a second electronic signal through another cellular data network to the automated travel billing server. The second electronic signal comprises the travel provider's mobile device location and the cell phone service provider location information for the travel provider's mobile device.

An automated travel billing server can be provided to perform the following steps. In step 806, process 800 can generate a first travel vector for a traveler that owns the traveler's mobile device. the step that generates the first travel vector for the traveler further. In step 808, process 800 tracks a location of a mobile device of the traveler by obtaining a series of GPS location information and the cell phone service provider location information for the traveler's mobile device. The series of GPS location information and the cell phone service provider location information for the mobile device of the traveler is included in the first travel vector.

In step 810, process 800 generates a second travel vector for a travel provider that owns the travel provider's mobile device by obtaining another series of GPS location information and another cell phone service provider location information for the travel provider's mobile device. The series of GPS location information and the other cell phone service provider location information for the travel provider's mobile device r is included in the second travel vector.

In step 812, process 800 determines that the traveler's location and movement is synchronized with the travel-service provider within a specified distance threshold. The specified distance threshold comprises specific constant distance between the traveler and the travel provider for a measured period of time.

In step 814, process 800 compares first travel vector with second travel vector by determining that the traveler and the travel provider are within the specific constant distance for the measured period of time. In step 816, process 800 determines that the first vector and the second vector are within the specified distance threshold. In step 818, process 800 measures the time period that the first vector and the second vector are within the specified distance threshold. In step 820, process 800 determines that the first vector and the second vector are not within the specified distance threshold and cease measuring the time period. In step 822, process 800 bills the traveler for the time period that the first vector and the second vector are within the specified distance threshold comprising a range of zero feet to ten feet.

CONCLUSION

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized system for automatic billing of transportation services comprising:
    a traveler's mobile device, wherein the traveler's mobile device comprises a traveler's mobile device global positioning system (GPS), and wherein the traveler's mobile device obtains a traveler's mobile device location from the traveler's mobile device GPS and a cell phone service provider location information for the traveler's mobile device and communicates a first electronic signal through a cellular data network to an automated travel billing server, and wherein the first electronic signal comprising the traveler's mobile device location and the cell phone service provider location information for the traveler's mobile device at a specified period to the automated travel billing server;
    a travel provider's mobile device, wherein the traveler provider's mobile device comprises a travel provider's global positioning system (GPS), wherein the travel provider's mobile device obtains a traveler provider's mobile device location from the travel provider's mobile device GPS and another cell phone service provider location information for the travel provider's mobile device and communicates a second electronic signal through another cellular data network to the automated travel billing server, and wherein the second electronic signal comprises the travel provider's mobile device location and the cell phone service provider location information for the travel provider's mobile device;
    the automated travel billing server that:
        generates a first travel vector for a traveler that owns the traveler's mobile device, wherein the step that generates the first travel vector for the traveler further comprises:
            tracking a location of a mobile device of the traveler by obtaining a series of GPS location information and the cell phone service provider location information for the traveler's mobile device, and wherein the series of GPS location information and the cell phone service provider location information for the mobile device of the traveler is included in the first travel vector;
        generating a second travel vector for a travel provider that owns the travel provider's mobile device by obtaining another series of GPS location information and another cell phone service provider location information for the travel provider's mobile device, and wherein the series of GPS location information and the other cell phone service provider location information for the travel provider's mobile device r is included in the second travel vector;
        determining that the traveler's location and movement is synchronized with the travel-service provider within a specified distance threshold, wherein the specified distance threshold comprises specific constant distance between the traveler and the travel provider for a measured period of time;
        comparing first travel vector with second travel vector by determining that the traveler and the travel provider are within the specific constant distance for the measured period of time;
        determining that the first vector and the second vector are within the specified distance threshold;
        measuring the time period that the first vector and the second vector are within the specified distance threshold;
        determining that the first vector and the second vector are not within the specified distance threshold and cease measuring the time period; and
        billing the traveler for the time period that the first vector and the second vector are within the specified distance threshold comprising a range of zero feet to ten feet.

2. The computerized system of claim 1, wherein the travel provider comprises a bus, a train or an airplane.

3. The computerized system of claim 2, wherein the travel provider comprises a ride-sharing service of an online transportation network.

4. The computerized system of claim 3, The computerized method of claim 3, wherein the mobile device of the user includes an application that:
    periodically communicates the location of the mobile device to an automatic billing of transportation services server; and
    manages payments for the traveler with respect to an e-commerce payment system.

* * * * *